(12) United States Patent
English et al.

(10) Patent No.: US 11,596,817 B2
(45) Date of Patent: Mar. 7, 2023

(54) FILTERING FABRIC AND PROCESS FOR FORMING SAME

(71) Applicant: SWNR Development, LLC, Pagosa Springs, CO (US)

(72) Inventors: Daniel L. English, Pagosa Springs, CO (US); Timothy James Smith, Pagosa Springs, CO (US); Dustin English, Pagosa Springs, CO (US)

(73) Assignee: SWNR Development, LLC, Pagosa Springs, CO (US)

( * ) Notice: Subject to any disclaimer, the term of this patent is extended or adjusted under 35 U.S.C. 154(b) by 0 days.

(21) Appl. No.: 17/410,370

(22) Filed: Aug. 24, 2021

(65) Prior Publication Data

US 2022/0062673 A1   Mar. 3, 2022

Related U.S. Application Data

(60) Provisional application No. 63/070,353, filed on Aug. 26, 2020.

(51) Int. Cl.
| | | |
|---|---|---|
| *A62B 23/02* | (2006.01) | |
| *B01D 39/16* | (2006.01) | |
| *B32B 7/09* | (2019.01) | |
| *B32B 7/12* | (2006.01) | |
| *B32B 27/12* | (2006.01) | |

(52) U.S. Cl.
CPC ........ *A62B 23/025* (2013.01); *B01D 39/1615* (2013.01); *B01D 39/1623* (2013.01); *B32B 7/09* (2019.01); *B32B 7/12* (2013.01); *B32B 27/12* (2013.01); *B01D 2275/10* (2013.01); *B32B 2250/03* (2013.01); *B32B 2250/40* (2013.01); *B32B 2307/724* (2013.01); *B32B 2307/7265* (2013.01); *B32B 2437/00* (2013.01)

(58) Field of Classification Search
None
See application file for complete search history.

(56) References Cited

U.S. PATENT DOCUMENTS

| | | | | |
|---|---|---|---|---|
| 2013/0198941 A1* | 8/2013 | John | .................... | B32B 27/08 2/455 |
| 2016/0288034 A1* | 10/2016 | Miyauchi | .................. | B32B 5/26 |
| 2017/0029989 A1* | 2/2017 | Tuscia | .................. | B32B 27/322 |

* cited by examiner

*Primary Examiner* — Chinessa T. Golden
(74) *Attorney, Agent, or Firm* — Conley Rose, P.C.; William H. Dietrich

(57) ABSTRACT

Embodiments disclosed herein include a stitched filtering fabric including a barrier layer configured to inhibit air flow through the filtering fabric, a yarn stitched through and forming a plurality of stitch holes in the barrier layer, and a first yarn layer comprising interlocking loops of the yarn. The barrier layer is configured to direct air flow through the yarn within the stitched holes.

16 Claims, 6 Drawing Sheets

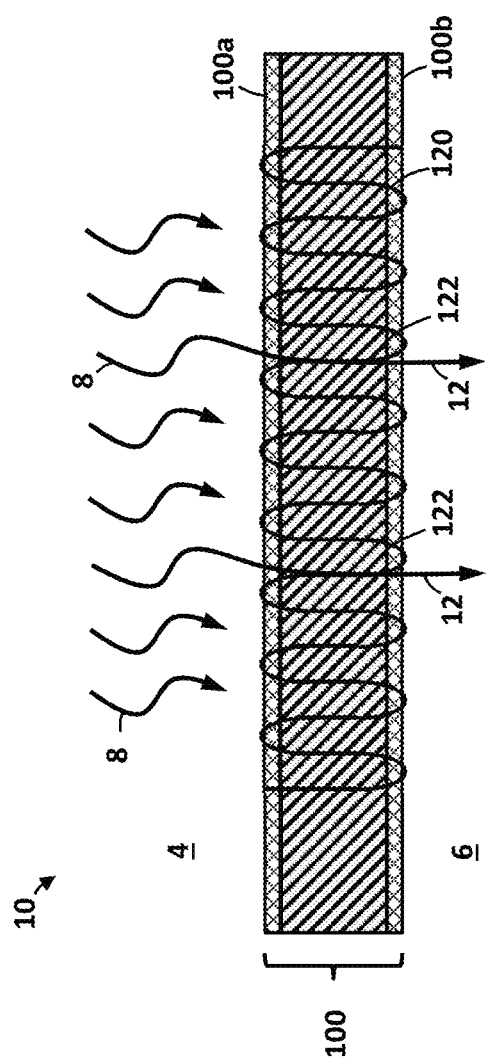
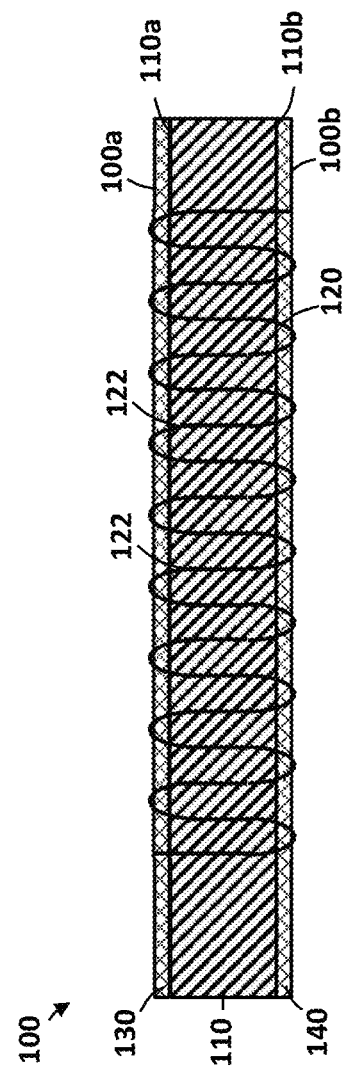

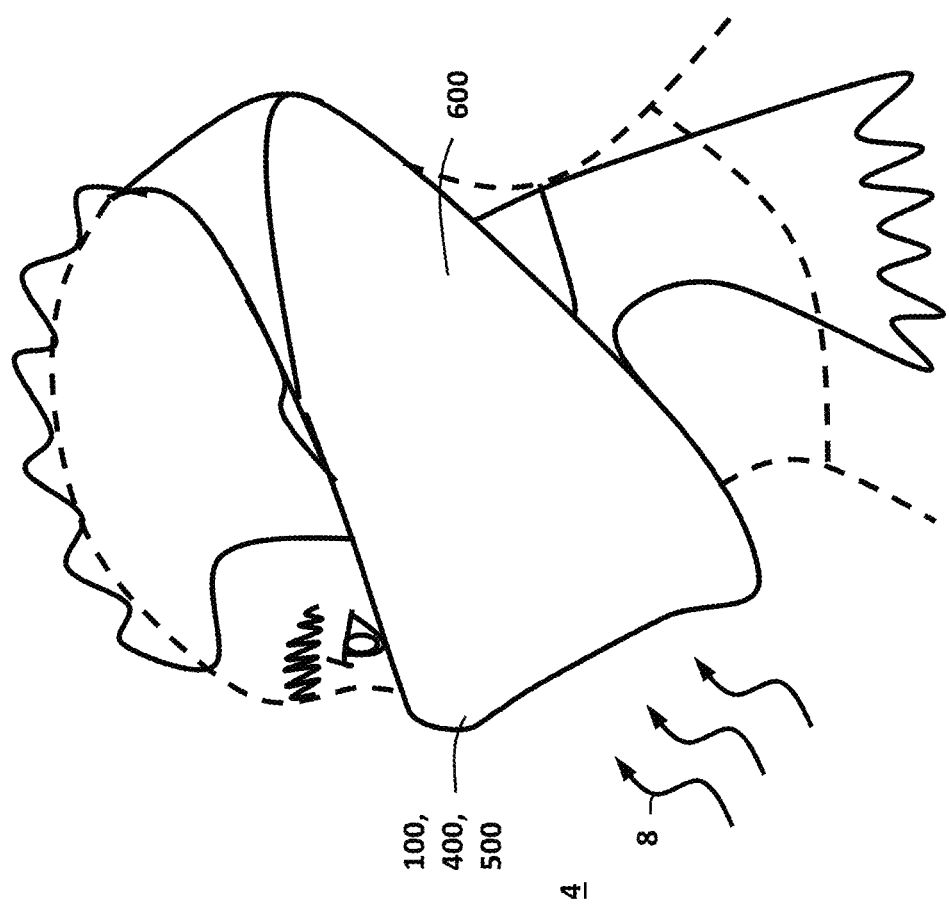

FILTERING FABRIC AND PROCESS FOR FORMING SAME

CROSS-REFERENCE TO RELATED APPLICATIONS

This patent application claims the benefit of U.S. Provisional Patent Application No. 63/070,353 filed Aug. 26, 2020 by Daniel L. English, et al., and titled "Filtering Fabric and Process for Forming Same," which is hereby incorporated by reference.

STATEMENT REGARDING FEDERALLY SPONSORED RESEARCH OR DEVELOPMENT

Not applicable.

TECHNICAL FIELD

This disclosure relates generally to fabric. More particularly, the disclosure relates to fabric which may be used for filtration fabrics and garments such as face masks and scarfs which may be used to filter air flow passing therethrough.

BACKGROUND

A filtration fabric is a fabric capable of removing unwanted substances (e.g., dust, pollen, mold, bacteria, viruses, etc.) from a gas or liquid by passing the gas or liquid through the filtration fabric. A filtration fabric may be used in, for example, industrial filters, window coverings, air-filtering devices, apparel, or personal protective equipment. A face mask is a device covering a wearer's mouth and nose to protect the wearer from inhaling hazardous substances, including germs, dusts, and droplets. Existing face masks are usually made of cloth or paper, and are often disposable after use.

BRIEF SUMMARY

Embodiments disclosed herein include a stitched filtering fabric including a barrier layer configured to inhibit air flow through the filtering fabric, a yarn stitched through and forming a plurality of stitch holes in the barrier layer, and a first yarn layer comprising interlocking loops of the yarn. In an embodiment, the barrier layer is configured to direct air flow through the yarn within the stitched holes.

Other embodiments disclosed herein are directed to a method of forming a stitched filtering fabric, including providing a barrier layer configured to inhibit air flow therethrough, stitching a yarn through the barrier layer to form a plurality of stitch holes in the barrier layer, interlocking the yarn along a first side of the barrier layer to form a first yarn layer, and heating the barrier layer to at least partially melt the barrier layer and allow the barrier layer to fill between at least a portion of the plurality of stitch holes and the yarn within the plurality of stitch holes.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which:

FIG. 1 is a cross-sectional view of a filtration system including an embodiment of a filtration fabric in accordance with principles described herein;

FIG. 2 is a cross-sectional view of the filtration fabric of FIG. 1;

FIG. 9 is an embodiment of a scarf or mask including the filtration fabric in accordance with principles described herein.

DETAILED DESCRIPTION OF ILLUSTRATIVE EMBODIMENTS

Figure 4:
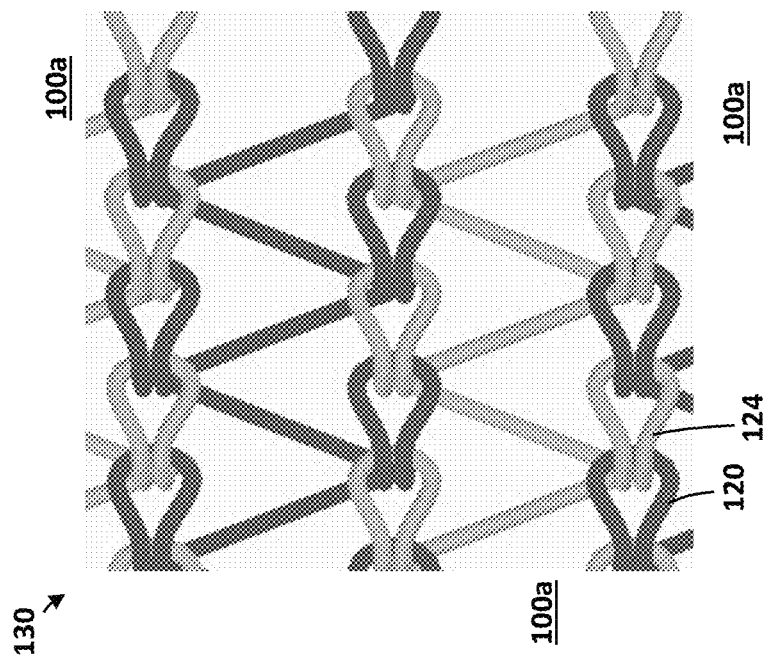
FIG. 4 is a detailed top view of the filtration fabric of FIG. 3.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. In addition, as used herein, the terms "inside", "outside", "upper", and "lower" are used for clarity in connection with the exemplary embodiments illustrated and should not be interpreted as limiting. For instance, an inner fabric layer shown near a user may also be used as the outer layer which faces away from a user, and air flow which passes from an outside space to an inside space may also flow in the opposite direction. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

As previously described above, fabric may be used to make filtration fabrics and garments such as face masks or scarfs that may be used to filter air flow passing therethrough. Accordingly, embodiments disclosed herein include filtering fabrics and methods for producing filtering fabrics that offer the potential to more effectively filter air. In particular, embodiments of filtering fabrics disclosed herein may selectively channel air flow through a plurality of yarns passing through a barrier layer that is otherwise configured to inhibit air and/or fluid flow therethrough.

Referring now to FIG. 1, an embodiment of a filtration system 10 is shown. In this embodiment, filtration system 10 includes a filtering fabric 100 that separates and divides an outer space 4 generally disposed adjacent a first side 100a of filtering fabric 100 from an inner space 6 generally disposed adjacent a second side 100b of filtering fabric 100. In other words, spaces 4, 6 are disposed on opposite sides of filtering fabric 100. In FIG. 1, the flow of unfiltered air within outer space 4 is represented with reference numeral 8, whereas the flow of filtered air passing through filtering fabric 100 into inner space 6 is represented with reference numeral 12. In particular, filtered air flow 12 passes through a plurality of stitch holes 122 as it moves through filtering fabric 100 from first side 100a to second side 100b. As will be described in more detail below, a yarn 120 also passes through the plurality of stitched holes 122, and thus, filtered air flow 12 passes through yarn 120 via interstitial spaces between the filaments of yarn 120. In addition, and as also discussed further below, in some embodiments the arrangement of yarns 120 forming the outer surfaces of filtering fabric 100 may also contribute to the filtration of filtered air flow 12.

Referring now to FIG. 2, filtering fabric 100 includes a barrier layer 110, yarn 120, a first yarn layer or face layer 130, and a second yarn layer or interior layer 140. Barrier layer 110 is configured to inhibit air and/or fluid flow through filtering fabric 100. In some embodiments, barrier layer 110 may comprise a material that is non-permeable to air or water. Alternatively, barrier layer 110 may comprise a material that is selectively permeable to air or water. Alternatively, barrier layer 110 may comprise a material that is permeable to water vapor while inhibiting liquid water transport. For example, in an embodiment, barrier layer 110 is a monolithic breathable membrane having a hydrophilic group on a polymer chain that allows physical transport of water vapor molecules while simultaneously blocking liquid water transport. In addition, in some embodiments, barrier layer 110 may be a perforated or microporous film including at least partially interconnecting pores. Still further, barrier layer 110 may comprise a non-woven material or a multi-layer film having combinations of porous, non-porous, and monolithic layers. It is anticipated that in some embodiments, barrier layer 110 may be formed from polyurethane, polyester, urethane, poly ether, polytetrafluoroethylene (PTFE), another polymer-based material, or combinations thereof; and may be manufactured using, for example, an extrusion, a melt blowing, or an electro spinning process. Thus, in general, and as described further below, barrier layer 110 may function to inhibit air and/or fluid flow through filtering fabric 100.

Referring still to FIG. 2, the yarn 120 is stitched through barrier layer 110 forming a plurality of stitch holes 122 in barrier layer 110, which are at least partially filled by yarn 120. In an embodiment, yarn 120 may be a filament type yarn having a denier count between about 50 and 200 and a filament count between about 100 and 3000 filaments, alternatively between about 800 and 1200 filaments, alternatively between about 900 and 1100 filaments. Denier is the weight of yarn mass in grams and is measured by weighing 9,000 meters of yarn. Yarn with a higher denier has more mass per unit length than one with a lower denier. The amount of filaments in a multi-filament yarn can be counted by means of light microscope imaging. In addition, in an embodiment, yarn 120 may be a sea-island fiber (e.g., matrix-fibril fibers) wherein a binder and a polymer are co-extruded such that yarn 120 comprises a polymer "island" distributed within a matrix formed "sea". The matrix of the second polymer may then be fully or partially dissolved and removed from yarn 120 during the formation of filtering fabric 100. It is anticipated that in an embodiment, sea-island fibers such as AVRA fibers, commercially available from Eastman Chemical Co., may be used. Further, in some embodiments the filaments may have a circular, elliptical, or a polygonal cross-section (e.g., square, rectangular, triangular, diamond, star, etc.). In other embodiments, yarn 120 may comprise a synthetic staple yarn made of polyester, polyester-blend, nylon, nylon-blend, carbon fiber, PTFE, or acrylic fibers. Further, yarn 120 may comprise a natural fiber such as wool, which may include discontinuous or partially restricted void spaces along the length of yarn 120 formed by interlocking, intertangled, and or randomly oriented constituent fibers or "hairs". Whether made of synthetic or natural materials, yarn 120 may have a low interstitial space between constituent fibers in the range of about 0.05 microns to about 5 microns, alternatively less than about 4 microns, alternatively less than about 3 microns, alternatively less than about 2 microns, alternatively less than about 1 micron. In some embodiments, yarn 120 may include copper, silver, or other antimicrobial materials (e.g., through combination or co-extrusion) and/or be treated with antimicrobial compounds. In some embodiments, yarn 120 may include or be treated with an anti-viral compound.

Referring still to FIG. 2, yarn 120 is stitched through barrier layer 110 and passed back-and-forth between a first side 110a and a second side 110b of barrier 110, which define sides 100a, 100b of filtering fabric 100, respectively. As a result, loops of yarn 120 are exposed along first side 100a and second side 100b of filtering fabric 100. The loops of yarn 120 extending from sides 100a, 100b of filtering fabric 100 may be interconnected to form a textile like surface along one or both sides 100a, 100b. For example, as shown in FIG. 2, loops of yarn 120 form first yarn layer 130, which abuts first side 110a of barrier layer 110, and form second yarn layer 140, which abuts second side 110b of barrier layer 110.

Figure 3:
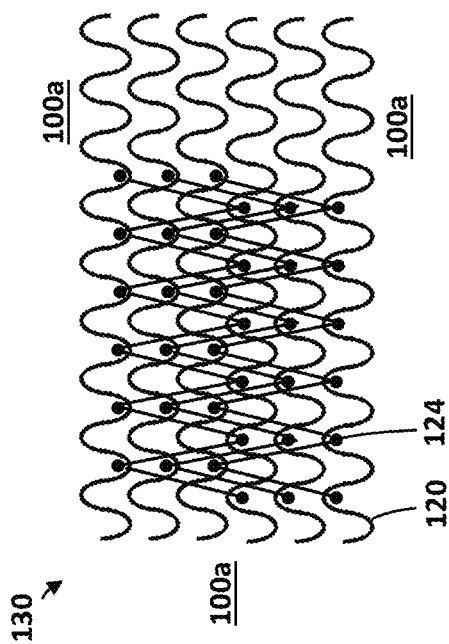
FIG. 3 is a top isometric view of the filtration fabric of FIG. 1 illustrating a yarn configuration.

Referring now to FIG. 3, a representative portion of filtering fabric 100 is shown in a top view to illustrate an exemplary embodiment of interlocking loops of yarns 120 forming first yarn layer 130. As shown in FIG. 3, six courses of yarn 120 are arranged in spaced-apart, generally parallel, horizontal rows. In addition, a second yarn 124 passes back and forth in a zig-zag pattern between the rows of yarn 120. Here, a plurality of three second yarns 124 are used, as each second yarn 124 passes over three rows of yarn 120 before being inserted into and passing through filtering fabric 100. Each of the second yarns 124 then passes back over three rows of yarn 120 before again being inserted into and passing through filtering fabric 100, thereby forming the zig-zag pattern, which is then repeated for each loop of yarn 120 extending to first side 100a to form first yarn layer 130.

In this embodiment, yarn 120 is held in place by yarn 124. In other words, yarn 120 and yarn 124 may be knitted or stitched together. In general, yarns 120, 124 may be simultaneously or sequentially stitched. An exemplary embodiment of first yarn layer 130 is shown in the detailed top view of FIG. 4, wherein loops of yarn 120 are interlocked with loops of second yarn 124. Although second yarn 124 is shown and described as passing over three rows of yarn 120 in this embodiment, other numbers of rows of yarn 120 maybe passes over during the zig-zag path. For instance, second yarn 124 may pass over one, two, four, or other numbers of rows of yarn 120 before second yarn 124 is passed through filtering fabric 100. In addition, in other embodiments, patterns other than a zig-zag may be used.

Referring again to FIGS. 2 and 3, yarn 120 is stitched through more than a majority (e.g., greater than 50%) of the surface area of barrier layer 110. In other words, the yarn 120 is stitched over a substantial portion of the length and width of barrier layer 110. Depending on how tightly the stitching is performed (e.g., spacing between stitched holes 122 of FIG. 2 and spacing between rows of yarn 120 of FIG. 3), the yarn 120 may permit portions of the underlying barrier layer 110 to be visible or may obscure all or a portion of the underlying barrier layer 110.

As previously described, the yarn 120 is stitched through barrier layer 110 forming a plurality of stitch holes 122 therein, which are at least partially filled by yarn 120. In some circumstances, it is desirable to seal each of these stitch holes 122 around yarn 120, for example to ensure any air flow (e.g., such as filtered air flow 12 of FIG. 1) is directed through yarn 120 rather than around it. Thus, in some embodiments, some or all of the stitch holes 122 are partially or fully filled around yarn 120 when barrier layer 110 is sufficiently heated. For example, the barrier layer 110 may be heated to a thermoplastic state, which allows a portion of the barrier layer 110 to melt, flow, and plug a portion of the stitch holes 122 in the barrier layer 102. Alternatively, the multifilament yarn may be coated with an adhesive material that aids in bonding the yarn to the barrier layer.

Figure 5:
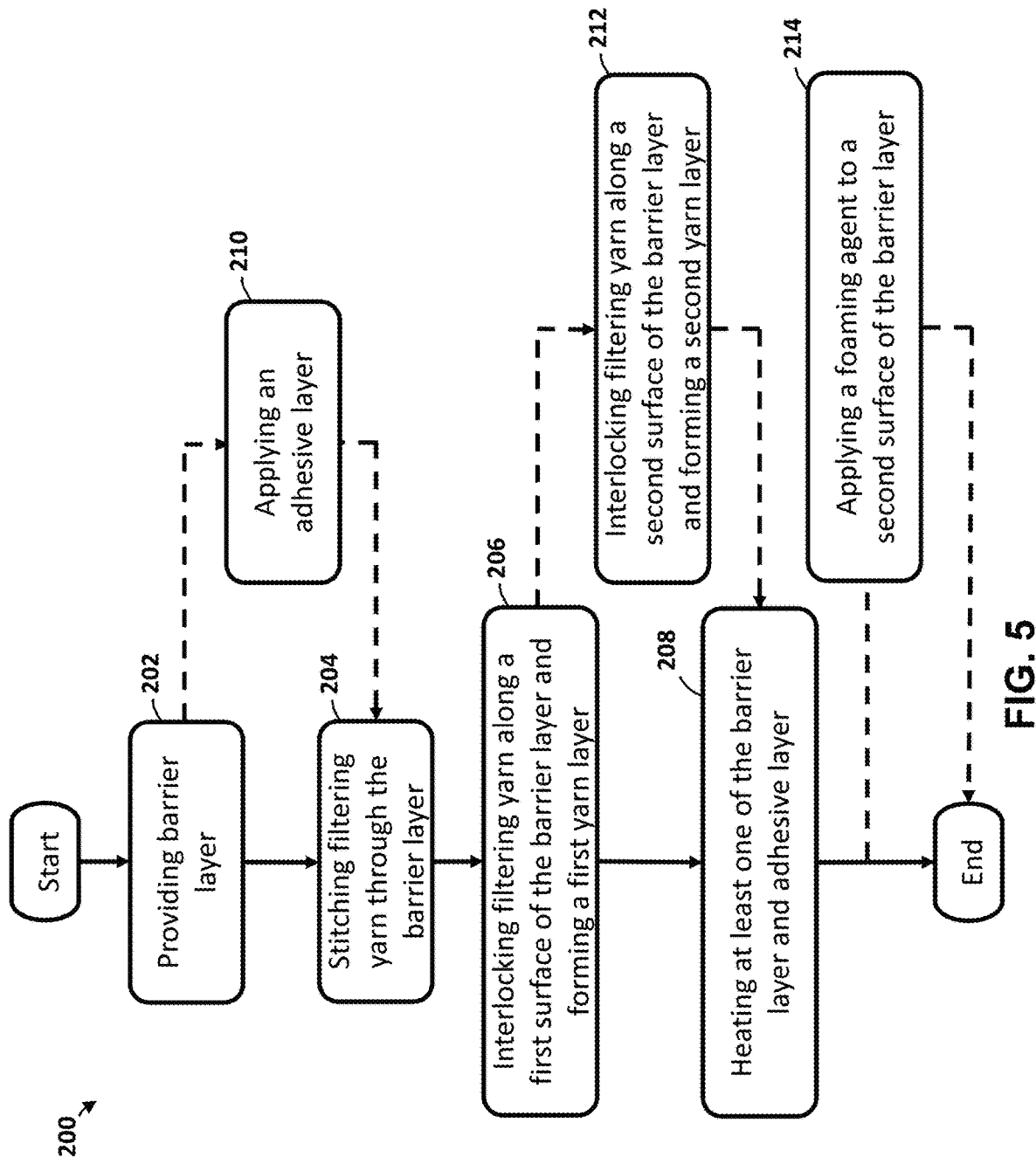
FIG. 5 is a flowchart illustrating an embodiment of a method for making the filtration fabric of FIG. 1 in accordance with principles described herein.

Referring now to FIG. 5, an embodiment of a method 200 for forming filtering fabric 100 is shown. Method 200 shown in FIG. 5 will now be described in connection with FIGS. 2 and 3. Method 200 begins at block 202, where a barrier layer 110 is provided. Next at block 204, yarn 120 is stitched through the barrier layer 110, thereby forming a plurality of stitch holes 122 as yarn 120 passes back-and-forth between first side 110a and second side 110b of barrier layer 110. Then at block 206, the yarn 120 is interlocked along a first surface of the barrier layer (e.g., along first side 110a or second side 110b) to form a first yarn layer 130. In the manner previously described, blocks 204 and 206 may be performed sequentially or concurrently to form first yarn layer 130. Then, in block 208, a portion of the barrier layer 110 may be heated to melt, flow, and plug a portion of the stitch holes 122 in the barrier layer 110 and to seal between stitch holes 122 and yarn 120 extending therethrough. It should be appreciated that heating of the barrier layer in block 208 may also melt portions of barrier layer 110 along at least one of sides 110a, 110b, which may bond to other layers abutting therewith such as first yarn layer 130. Some embodiments, such as the embodiment of FIG. 2, include second yarn layer 140, and thus, method 200 may optionally include block 212 in which interlock yarn 120 is interlocked along second side 110b of barrier layer 110 to form second yarn layer 140.

In some embodiments, an additional adhesive layer may also be added at block 210 along at least one of the first side 110a and second side 110b of barrier layer 110. Accordingly, such an adhesive layer may be located underneath at least one of the first yarn layer 130 and the second yarn layer 140. In such embodiments, the adhesive layer may also be activated and/or melted at block 208 as heating is applied. Portions of the adhesive layer and/or barrier layer may then together or individually melt, flow, and plug a portion of the stitch holes 122 in barrier layer 110, seal between stitch holes 122 and yarn 120, provide bonding with abutting layers such as yarn layers 130, 140, or combinations thereof. In some embodiments, at least one of the barrier layer 110 or adhesive layer is heated to a temperature that melt portions of the barrier layer 110 and/or the adhesive layer, while not melting yarn 120 or first yarn layer 130. It is anticipated that at least one of the barrier layer 110 and the adhesive layer may be heated to a temperature greater than or equal to about 140° C. (about 284° F.), alternatively between about 140° C. and about 180° C. (about 284° F. to about 356° F.), or alternatively to about 360° C. (about 680° F.).

Figure 6:
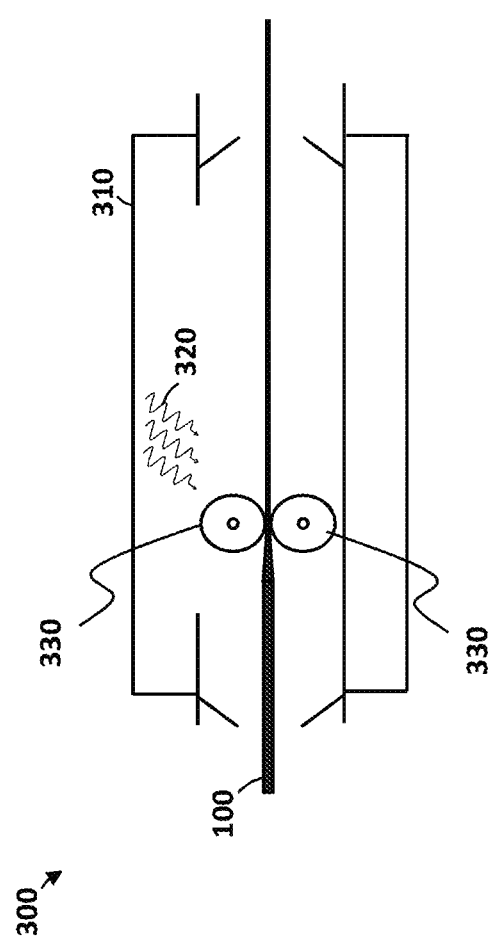
FIG. 6 is a schematic view of an embodiment of a heating device use to heat the filtering fabric of FIG. 1.

Referring to FIGS. 5 and 6, the heating in block 208 may be performed within a heating system 300 including an oven 310 that applies heat 320 to filtering fabric 100. In an embodiment, nip laminators or rollers 330 are used to feed filtering fabric 100 through oven 310 as heat 320 is applied thereto. In some embodiments, heat 320 may be applied via infrared radiation (IR), convective, or ultrasonic heating.

In an embodiment, nip laminators 330 feed filtering fabric 100 at a rate of approximately five yards per minute. In addition, the gap or spacing between the surfaces of nip laminators 330 may be varied to adjust the desired compressive forces applied to filtering fabric 100 and to adjust to the thickness of filtering fabric 100.

Figure 7:
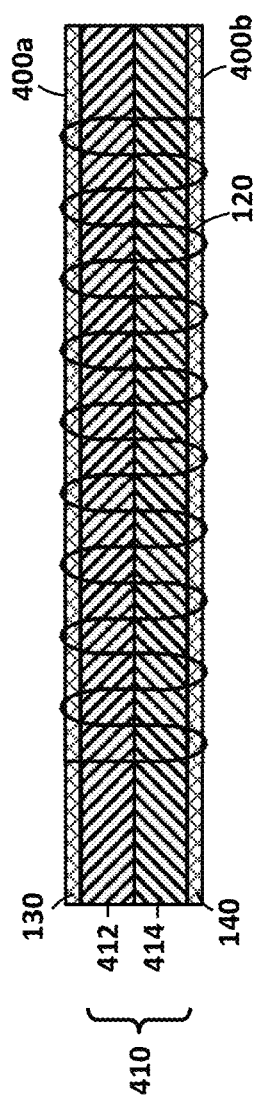
FIG. 7 is a cross-sectional view of an embodiment of a filtration fabric in accordance with principles described herein.

Referring now to FIG. 7, another embodiment of a filtering fabric 400 is shown. Filtering fabric 400 may be used in place of filtering fabric 100 in filtering system 10 previously described and shown in FIG. 1. Filtering fabric 400 is similar to filtering fabric 100 previously described, and thus, components of filtering fabric 400 that are shared with filtering fabric 100 are identified with like reference numerals, and the descriptions below will focus on features of filtering fabric 400 that are different from filtering fabric 100.

In this embodiment, filtering fabric 400 includes multiple layers within a barrier layer 410. In particular, barrier layer 410 includes a first sub-layer 412 and a second sub-layer 414. Although two sub-layers 412, 414 are provided in this embodiment, in other embodiments, the barrier layer (e.g., barrier layer 410) may include more than two sub-layers. In this embodiment, first sub-layer 412 comprises the materials and structure disclosed for barrier layer 110 previously described, and thus, may include a monolithic breathable membrane, a perforated film, or a microporous film, each of which may or may not be permeable to air, water vapor, or liquid water transport. Similarly, in this embodiment, second sub-layer 414 comprises the materials and structure disclosed for barrier layer 110. The material and structure for sub-layers 412, 414 may be the same or different. In addition, one of the first sub-layer 412 and the second sub-layer 414 may comprise the adhesive layer as discussed previously with respect to block 210 of FIG. 5. For example, in one embodiment, the adhesive layer of layers 412, 414 is between approximately 0.5-mils and approximately 2-mils thick (0.0005-in to 0.002-in) and may comprise a thermoplastic or a copolyamide material. In particular, the adhesive layer of layers 412, 414 may be a textile adhesive such as a polyurethane adhesive film or an ethylene-vinyl acetate, and further, may be heat sensitive and/or pressure sensitive.

Figure 8:
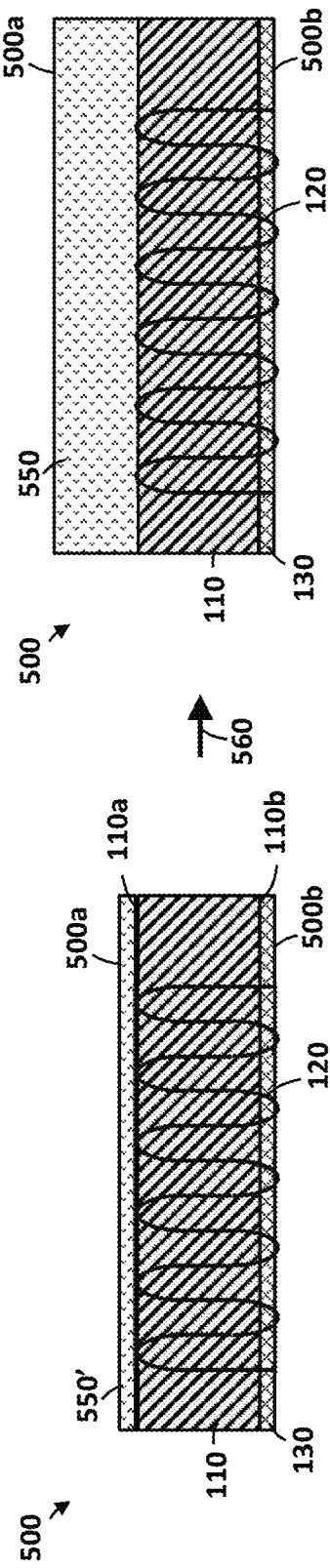
FIG. 8 is a cross-sectional view of an embodiment of a filtration fabric in accordance with principles described herein.

Referring now to FIG. 8, another embodiment of a filtering fabric 500 is shown. Filtering fabric 500 may be used in place of filtering fabric 100 in filtering system 10 previously described and shown in FIG. 1. Filtering fabric 500 is similar to filtering fabric 100 previously described, and thus, components of filtering fabric 500 that are shared with filtering fabric 100 are identified with like reference numerals, and the descriptions below will focus on features of filtering fabric 500 which are different from filtering fabric 100.

In this embodiment, filtering fabric 500 includes a foam layer 550. Foam layer 550 extends from first side 110a of barrier layer 110, and thus, defines a first side 500a of filtering fabric 500 that is free from exposed yarns 120 (individually or as stitched together). Foam layer 550 may be adhered to first side 110a using an adhesive after the production of filtering fabric 100 as produced by method 200 of FIG. 5, or foam layer 550 may be formed by applying a foaming agent to a surface of barrier layer 110 as shown in block 214 of method 200 of FIG. 5. In an embodiment, foam layer 550 includes voids or pockets of trapped gases or liquids, such as closed cell aerogel foam, polyurethane foam (i.e., foam rubber), polystyrene foam, or polyvinyl chloride (PVC) foam. First side 500a may also include a non-foaming coating such as polyurethane. In some embodiments, foam layer 550 may include copper, silver, or other antimicrobial materials (e.g., through combination or coating) and/or be treated with antimicrobial compounds. In some embodiments, foam layer 550 may include anti-viral materials (e.g., through combination or coating) and/or be treated with anti-viral compounds. Although the embodiment of FIG. 8 includes a foam layer 550, it should be appreciated that foam layer 550 may also be substituted for a filtering non-woven layer which may be adhered to first side 110a using an adhesive after the production of filtering fabric 100 as described previously above.

Referring again to FIG. 8, in an embodiment, the foam layer 550 of filtering fabric 500 begins as a foaming agent 550' that is applied to barrier layer 110, which has already been heated in block 208 of method 200. To activate foaming agent 550' and form foam layer 550, heat or a chemical catalyst may then be applied to cure and expand the thickness of foaming agent 550'. In the embodiment of FIG. 8, foam layer 550 may completely cover the first side 110a of barrier layer 110, and thus, may fully cover yarns 120 which would have otherwise been exposed as the first side 500a of filtering fabric 500. While not specifically shown, in some embodiments, foam layers 550 may be applied to both sides 500a, 500b of filtering fabric 500, and filtering fabric 500 may comprise a second yarn layer 140 along first side 110a. Stated alternatively, a foaming agent 550' may be applied to the embodiment of filtering fabric 100 shown in FIG. 2 to form an additional foam layer 550 extending from one or both of sides 100a.

Referring now to FIG. 9, in an embodiment, filtering fabric 100, 400, 500 may be used to form a scarf or mask 600 worn to filter air flow. Scarf 600 may be worn around the nose and/or mouth as a barrier that divides air flow 8 in the outer space 4 apart from the inner space 6 (as shown in FIG. 1), which coincides with the interior surface of scarf 600 proximate the users face. Either surface of filtering fabric 100, 400, 500 may be selected as the outward or inward facing surface of scarf 600, as desired for user comfort, warmth, filtration, etc. For example, foam layer 550 may be selected in some embodiments of scarf 600 as the interior surface to provide comfort and warmth. Alternatively, foam layer 550 may be selected in some embodiments of scarf 600 as the exterior surface to serve as a pre-filter to capture larger particulates within air flow 8, before finer particle filtration is provided by yarn layers 130, 140 and yarns 120 passing through barrier layer 110.

In the manner described, embodiments disclosed herein include filtration fabrics and methods of forming filtration fabrics which may be used to filter air flow. In particular, a barrier layer within the filtration fabric may be configured to inhibit air flow, thus directing air flow through filtering yarns which pass through the barrier layer and in some embodiments cover portions of the barrier layer.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A stitched filtering fabric comprising:
   a barrier layer configured to inhibit air flow therethrough;
   a yarn stitched through and forming a plurality of stitch holes in the barrier layer, wherein the plurality of stitch holes are configured to permit air flow through the barrier layer; and
   a first yarn layer comprising interlocking loops of the yarn;
   wherein the barrier layer is configured to direct air flow through the yarn within the stitched holes.

2. The stitched filtering fabric of claim 1, further comprising a second yarn layer disposed along a side of the barrier layer opposite the first yarn layer, wherein the second yarn layer comprises interlocking loops of the yarn.

3. The stitched filtering fabric of claim 1, wherein the yarn comprises a sea-island fiber.

4. The stitched filtering fabric of claim 1, wherein the yarn has a denier count between about 50 and about 200 and a filament count between about 100 and about 3000.

5. The stitched filtering fabric of claim 1, wherein at least 25 percent of the yarn includes a filament having a cross-sectional shape selected from the group consisting of circular, elliptical, square, rectangular, triangular, star, multi-lobal, and diamond.

6. The stitched filtering fabric of claim 1, further comprising an adhesive disposed along the barrier layer, wherein a melted portion of at least one of the adhesive and the barrier layer fills between at least a portion of the stitch holes and the yarn.

7. The stitched filtering fabric of claim 6, wherein a melted portion of at least one of the adhesive and the barrier layer bonds the barrier layer and the first yarn layer.

8. The stitched filtering fabric of claim 1, wherein the yarn comprises a plurality of filaments having an interstitial space between the plurality of filaments ranging between about 0.05 microns to about 5 microns.

9. The stitched filtering fabric of claim 1, wherein a melted portion of the barrier layer fills between at least a portion of the stitch holes and the yarn.

10. The stitched filtering fabric of claim 9, wherein the yarn comprises a plurality of filaments having an interstitial space between the plurality of filaments ranging between about 0.05 microns to about 5 microns.

11. The stitched filtering fabric of claim 9, wherein the yarn comprises wool.

12. The stitched filtering fabric of claim 11, wherein the barrier layer comprises a first sub-layer having a first melting point and a second sub-layer having a second melting point different from the first melting point.

13. The stitched filtering fabric of claim 12, wherein the first sub-layer is an adhesive and the second sub-layer is a porous membrane.

14. The stitched filtering fabric of claim 12, wherein the first sub-layer is an adhesive and the second sub-layer is a non-porous film.

15. The stitched filtering fabric of claim 1, further comprising an adhesive disposed along the barrier layer, wherein the adhesive bonds the barrier layer and the first yarn layer.

16. The stitched filtering fabric of claim 1, wherein the barrier layer is configured to partially melt upon application of heat.

* * * * *